United States Patent [19]

Steels

[11] 4,371,329
[45] Feb. 1, 1983

[54] APPARATUS FOR MAKING CONFECTIONERY

[75] Inventor: Gordon Steels, Peterborough, England

[73] Assignee: Baker Perkins Holdings Limited, Peterborough, England

[21] Appl. No.: 269,856

[22] Filed: Jun. 3, 1981

[30] Foreign Application Priority Data

Jun. 18, 1980 [GB] United Kingdom ............... 8019864

[51] Int. Cl.³ .......................... B29C 7/00; B29C 3/02
[52] U.S. Cl. .......................... 425/437; 425/DIG. 102
[58] Field of Search ............... 425/441, 134, 436, 437, 425/438, 439, DIG. 102

[56] References Cited

U.S. PATENT DOCUMENTS

| | | | |
|---|---|---|---|
| 681,655 | 8/1901 | Perky | 425/437 |
| 786,773 | 4/1905 | Marsh | 425/437 |
| 1,451,031 | 4/1923 | Speck | 425/441 |
| 1,839,731 | 1/1932 | Baum | 425/437 |
| 1,883,482 | 10/1932 | Bausman et al. | 425/437 |
| 1,992,135 | 2/1935 | Underwood | 425/437 |
| 3,394,646 | 7/1968 | Cunningham et al. | 425/437 |

FOREIGN PATENT DOCUMENTS

| | | | |
|---|---|---|---|
| 2410872 | 9/1975 | Fed. Rep. of Germany | 425/437 |
| 485731 | 9/1975 | U.S.S.R. | 425/437 |

*Primary Examiner*—Willard E. Hoag
*Attorney, Agent, or Firm*—Watson, Cole, Grindle & Watson

[57] ABSTRACT

The invention relates to confectionery moulding apparatus through which moulds, each containing at least one mould cavity having minute holes in its base, are traversed successively by a conveyor. After filling with confectionery and subsequently cooling the moulds pass in inverted relation beneath a demoulding unit which blows air through the holes in the bases of the mould cavities to eject the confectionery from the cavities. To reduce the force required for demoulding each mould has a backing plate spaced from the perforated base of the mould cavity or each mould cavity to define an air chamber and the demoulding unit includes an air pipe which is brought into sealing engagement with a hole in the backing plate of each mould to deliver air into the chamber and so effect demoulding.

5 Claims, 15 Drawing Figures

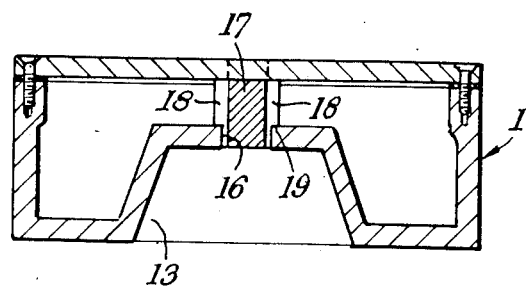
Fig. 9.
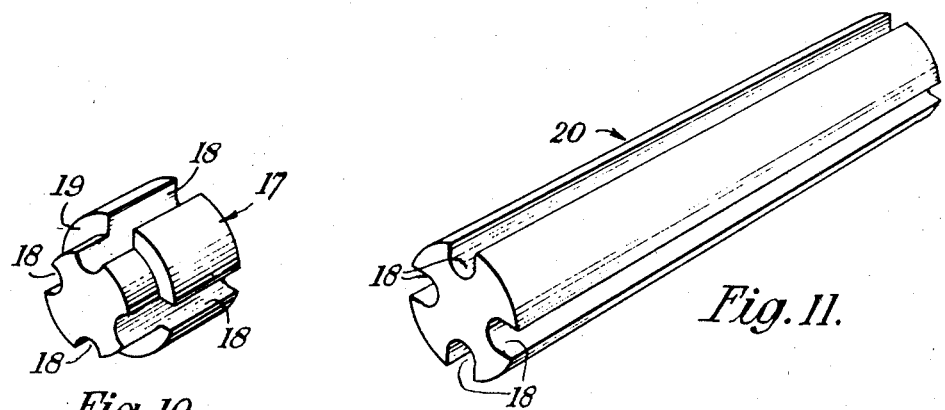
Fig. 10.   Fig. 11.
Fig. 12.
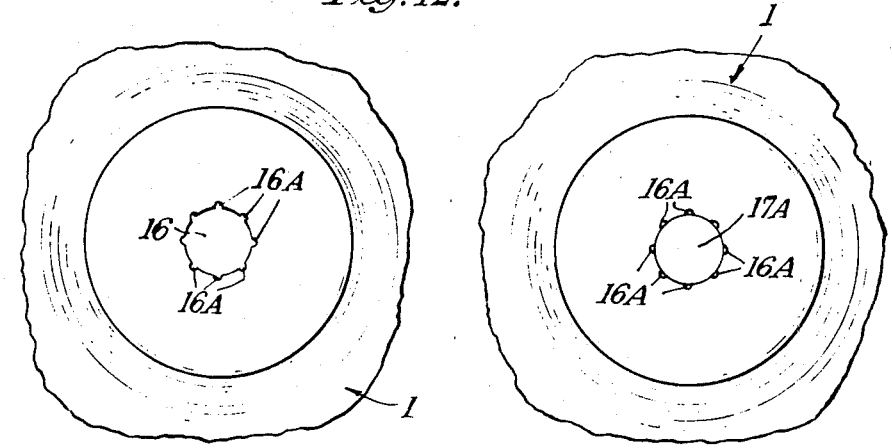
Fig. 13.   Fig. 14.

APPARATUS FOR MAKING CONFECTIONERY

In the moulding of confectionery by the starchless moulding process as described in commonly owned British Pat. No. 1050699, the moulded pieces of confectionery are removed from the moulds by blowing air through small holes in the bases of the mould cavities whilst the moulds are in an inverted position, the holes having a diameter not substantially exceeding 0.020 inch.

Figure 2:
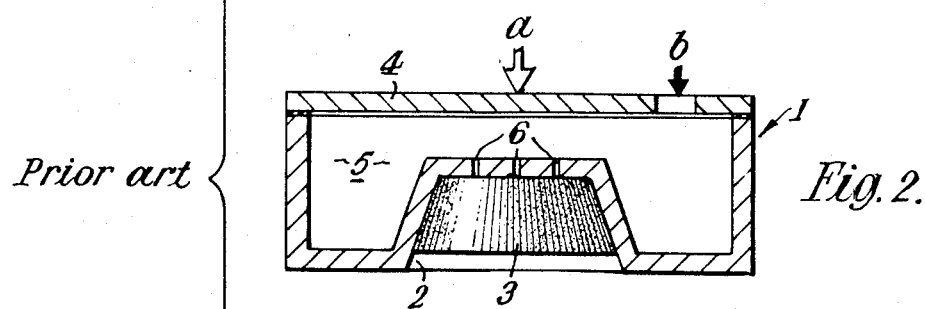

FIG. 2 of the drawings of this British Patent illustrates application of a pressure plate 67 to the open back of each inverted mould to seal against the mould rim and form a chamber to which compressed air is supplied for the demoulding operation. In order to effect a satisfactory seal between the pressure plate and the mould rim, a force in excess of six tons is required with the result that the moulds and demoulding mechanism used must be very strong to withstand so high a force. It is an object of the present invention to provide an improved method of air demoulding and mould for carrying out the method, whereby the force required in the demoulding operation is substantially reduced so that it is only a fraction of that required with the apparatus of British Pat. No. 1050699.

Figure 1:
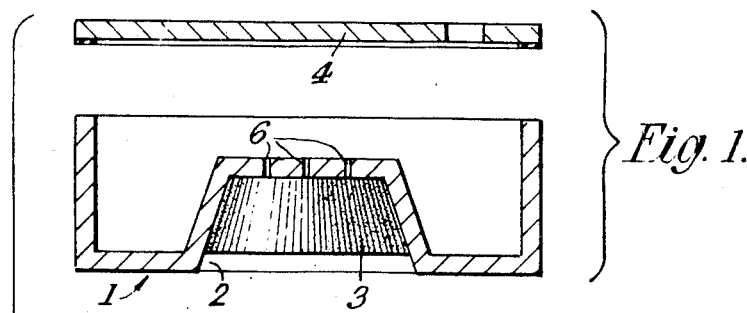
Figure 3:
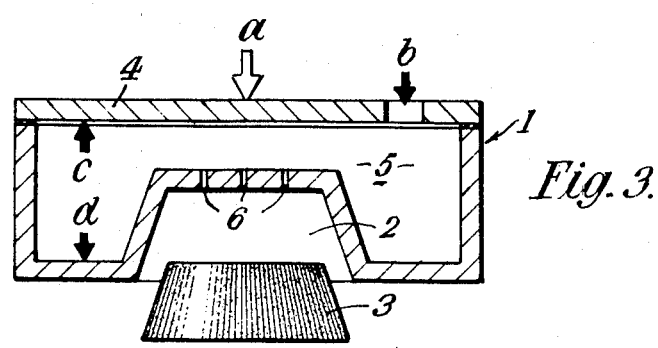

The demoulding steps of the method according to British Pat. No. 1050699 are illustrated in FIGS. 1 to 3 of the accompanying drawings. FIG. 1 shows an inverted mould 1 with its cavity 2 filled with confectionery 3, which has been carried by a chain circuit into position below a pressure plate 4. FIG. 2 shows the pressure plate 4 clamped against the back of the mould 1 and sealed against the mould rim by a force 'a', thus forming a chamber 5, and FIG. 3 shows the chamber 5 pressurised by air supplied at 'b' and the confectionery 3 demoulded from the cavity 2 by passage of air from the chamber 5 through minute holes 6 in the base of a cavity to impinge against the confectionery 3.

The reaction force on the mould must obviously be equal to the clamping force 'a' and the air pressure will, as indicated at 'c' and 'd', tend to move the mould and the pressure plate apart, the separating force being a product of the surface area within the pressurised chamber and the air pressure per unit area.

In a typical example, the mould has an area of 360 square inches and a demoulding air pressure of 30 p.s.i. is used. The separating force is therefore 10800 lbs., and to this must be added the force required to effect a seal between the pressure plate and the mould rim.

To cater for forces of this magnitude, the mould in the apparatus of British Pat. No. 1050699 is supported by a series of longitudinal comb bars 65 disposed beneath the mould which in turn are carried on substantial cross stretchers forming an integral part of the demoulding head. This means the demoulding apparatus comprises a strong, bulky and therefore relatively expensive construction.

The present invention provides apparatus for moulding confectionery, comprising a conveyor for traversing moulds, each having at least one cavity containing in its base a number of minute holes, after filling of the mould cavities with confectionery and subsequently cooling, in inverted relation beneath a demoulding unit at which the confectionery is ejected from the mould cavities by blowing air through said holes, each mould having a backing plate spaced from the minute holes in the base of its cavity or cavities and fixed to the mould to define an air chamber communicating with the holes and the demoulding unit including an air pipe, means for moving the air pipe into sealing engagement with a hole in the upwardly facing backing plate of each mould arriving at the demoulding unit and means for discharging compressed air from the pipe into the air chamber to effect demoulding of the confectionery in each cavity in the mould.

Figures 4, 4A:
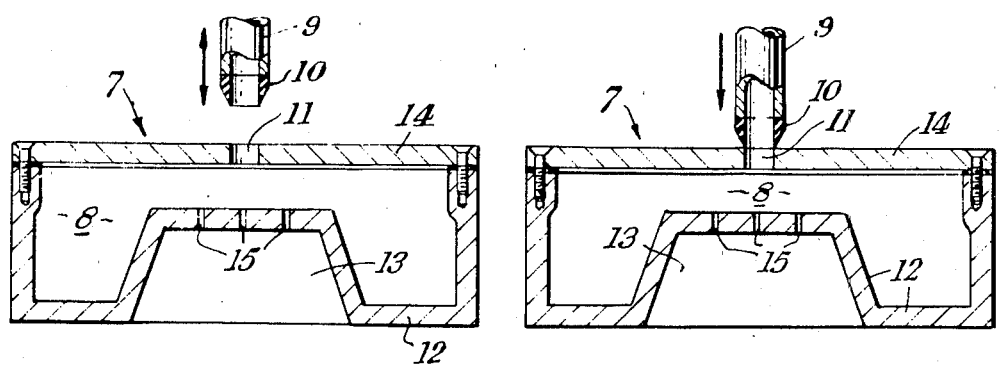

The invention will now be described in further detail, with reference to FIGS. 4–14 of the accompanying drawings, in which like reference numerals denote like parts throughout the Figures, and FIGS. 4 and 4A are diagrams, similar to FIGS. 1–3, illustrating successive states in demoulding of a mould constructed in accordance with the invention.

Figure 5:
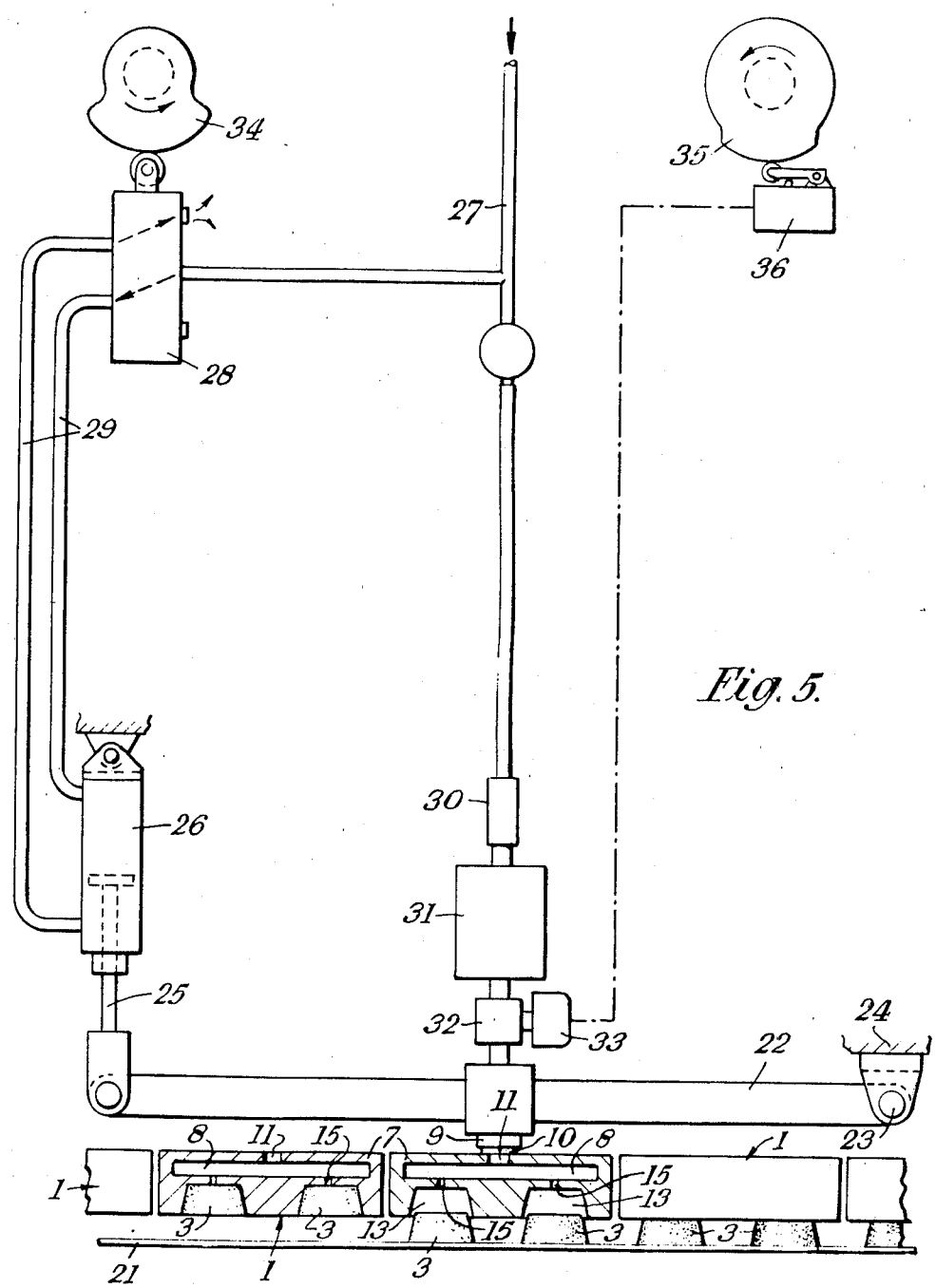
Figure 6:
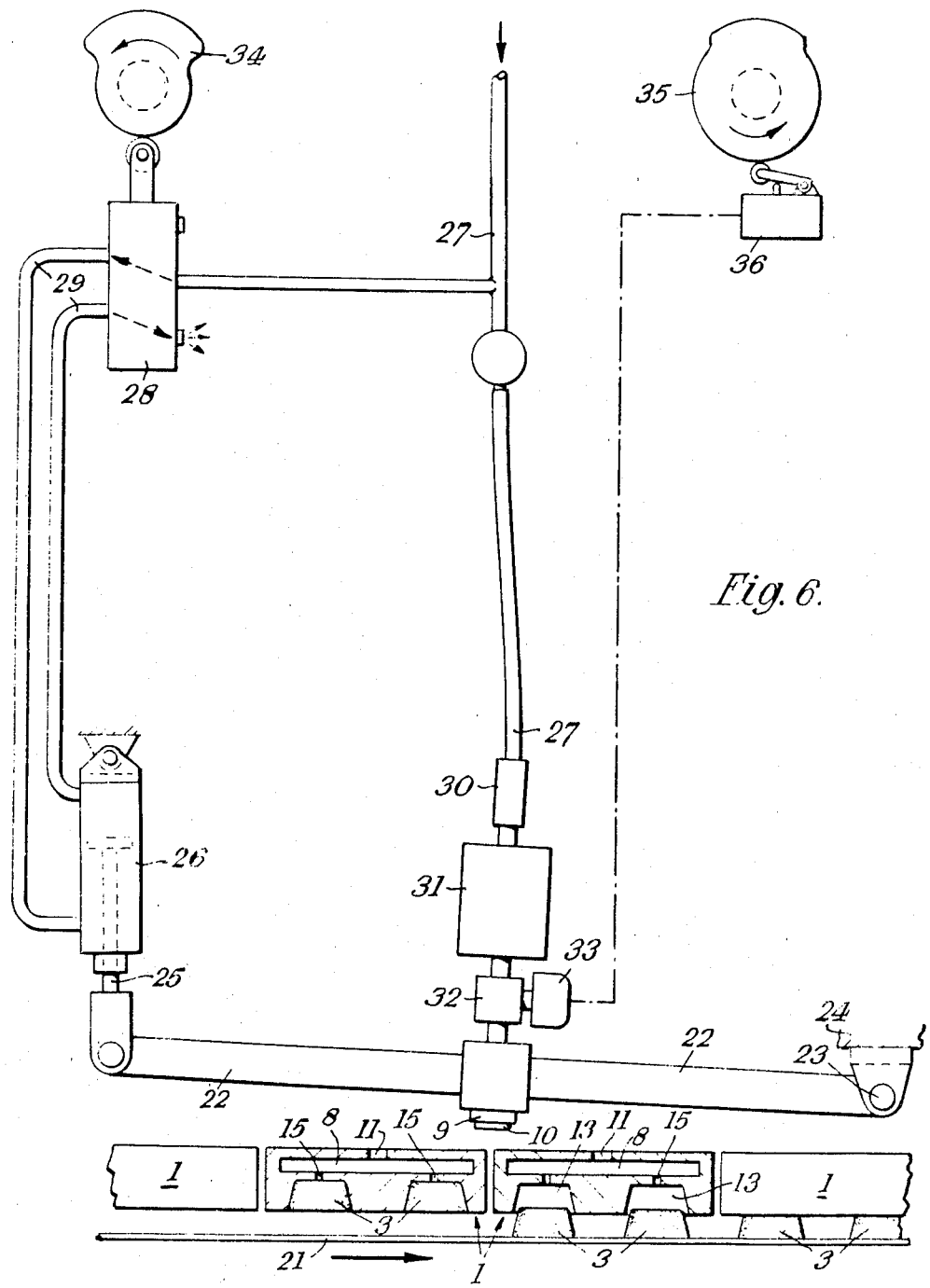
Figure 7:
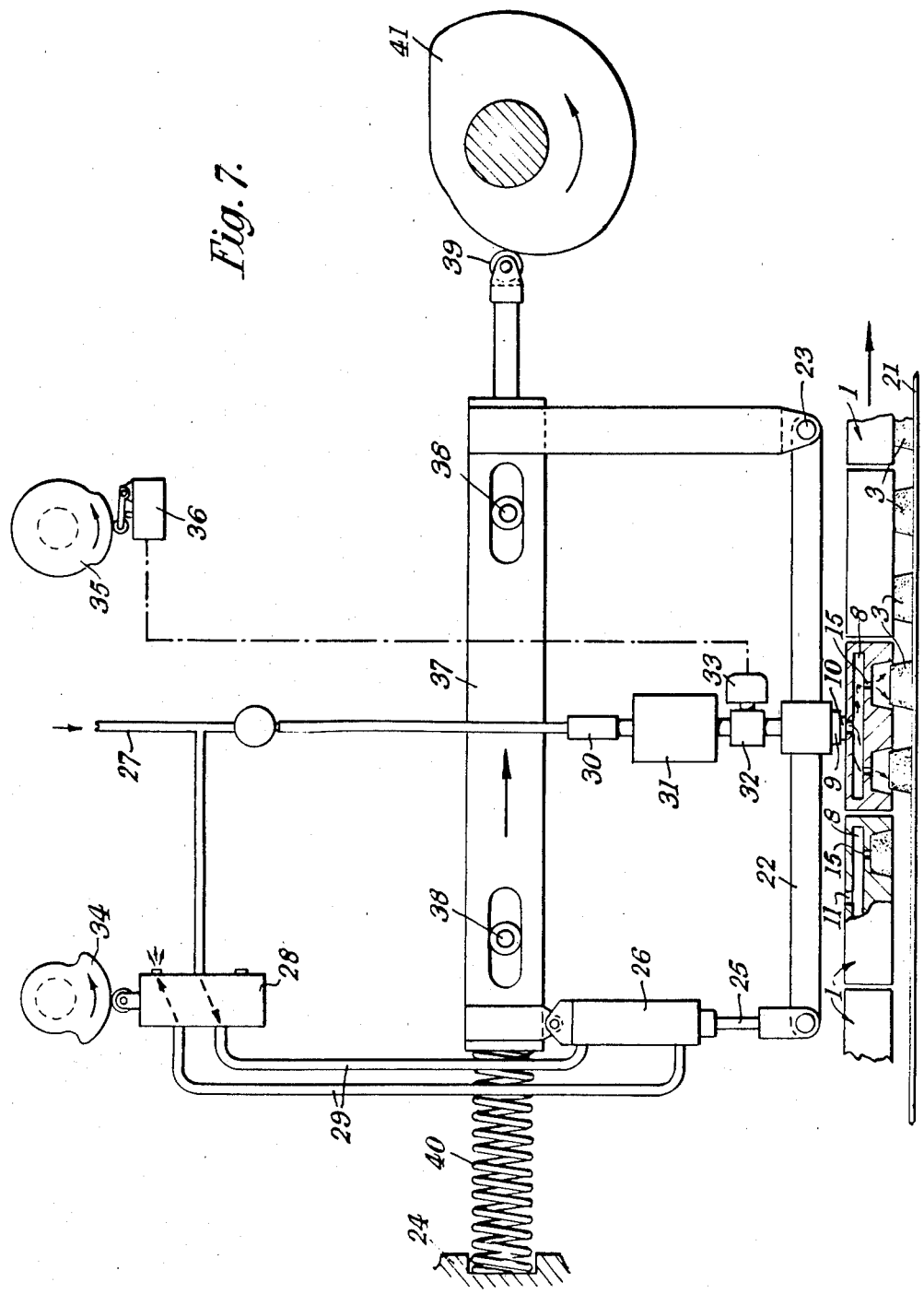
Figure 8:
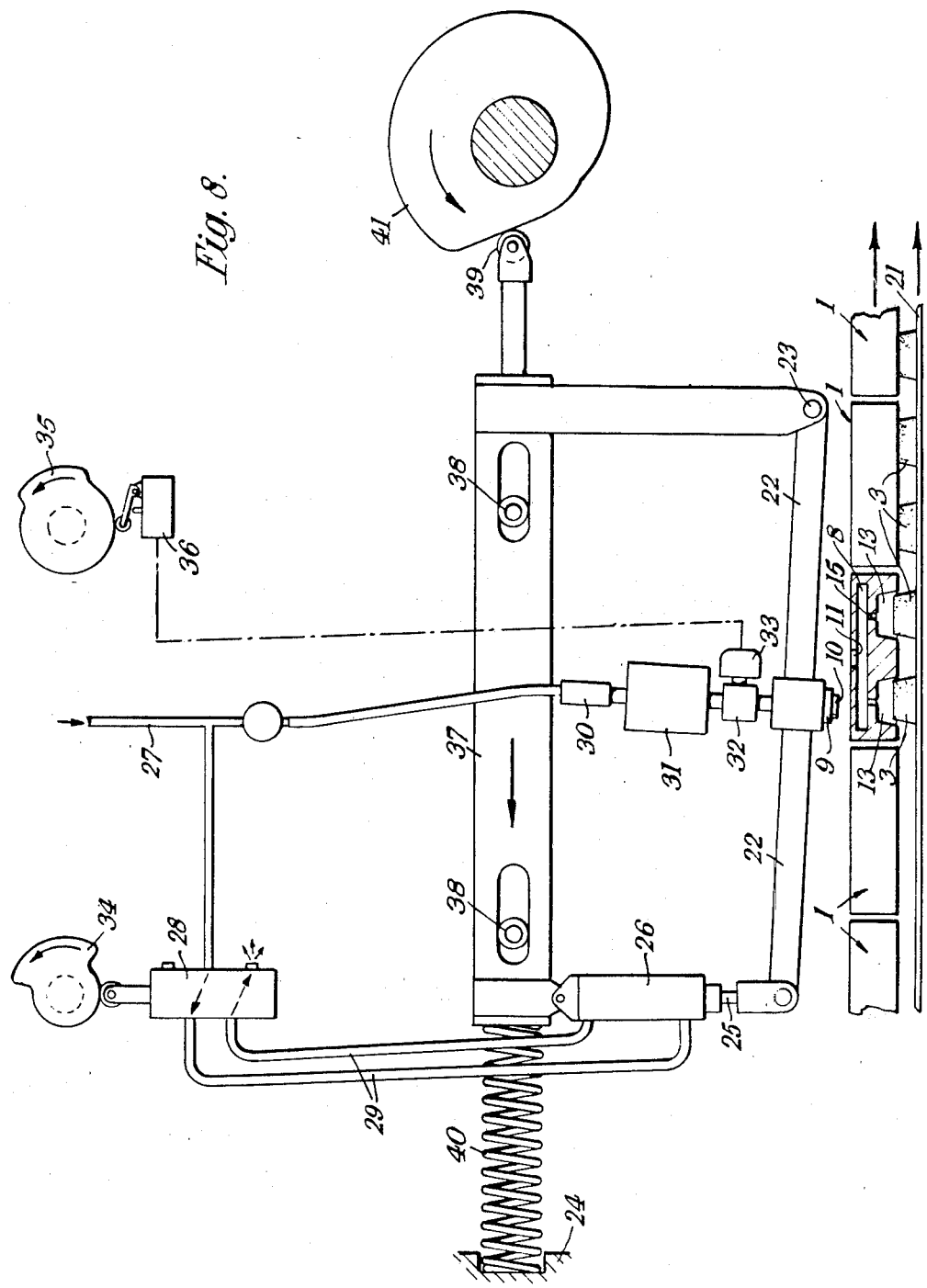

FIGS. 5 and 6 illustrate in more detail the demoulding unit for use when the moulds are moved intermittently and dwell during the demoulding operation, FIGS. 7 and 8 are similar views showing a modified form of demoulding unit suitable for use when the moulds move continuously through the demoulding station, and FIGS. 9–14 are diagrams illustrating expedients whereby the drilling of minute air holes in the bases of the moulds may be avoided.

The mould 7, shown in cross-section in FIGS. 4 and 4A, includes an air chamber 8, and an air inlet pipe 9, fitted with an end seal 10, is moved into register with a hole 11 in the back of the mould for the purpose of pressurising the air chamber 8 and so ejecting the confectionery 3 in the mould cavity 13 by blowing air through minute holes 15, each having a diameter not exceeding 0.020 inch, in the base of the cavity.

The mould 7 is manufactured in two parts comprising a mould body 12 containing the cavity 13 and a backing plate 14 containing the hole 11 which is fixed to the body 12 by screws to form the air pressure chamber 8.

Again assuming the area of the backing plate to be 360 square inches and the demoulding air pressure to be 30 p.s.i., the only force involved is that required to effect a seal between the pipe 9 and the back of the mould. With a hole 11 having an area of 0.75 square inch this force is only 0.75×30=22.5 lbs as compared with the force of 10800 lbs in the case of a comparable open backed mould.

Since only a force of 22.5 lbs has to be supported the chains to which the moulds are attached can carry the load and additional support, such as the heavy comb bars in British Pat. No. 1050699, are not required. Light comb bars can, however, be provided if desired for the purpose of guiding the pieces ejected from the mould.

FIGS. 5 and 6 show a demoulding unit of a confectionery moulding apparatus which, apart from the construction of the moulds and of the demoulding unit, operates generally as described in British Pat. No. 1050699. As therein described, moulds 1 are traversed in continuous procession by a chain conveyor beneath a depositor which fills the mould cavities with soft fondant, then through a cooling unit and then in an inverted position beneath the demoulding unit at which the confectionery is discharged by air pressure from the moulds onto a delivery band 21.

In the case illustrated in FIGS. 5 and 6 the moulds 1 move discontinuously, from left to right as seen in the Figures, and dwell beneath the demoulding unit during demoulding. The air pipe 9 is mounted on a clamp bar 22, pivoted at one end 23 to the machine frame 24 and at the other to the piston rod 25 of an air cylinder 26. A compressed air supply line 27 is connected through an air valve 28 and lines 29 to the cylinder 26 and through a non-return valve 30 to an air reservoir 31, which is connected to the air pipe 9 through a valve 32 controlled by a solenoid 33.

When a mould 1 comes to rest beneath the air pipe 9, a cam 34 actuates the valve 28 to cause the piston in the cylinder 26 to lower the bar 22 and bring the air pipe 9 into register with the hole 11 in the back of the mould as shown in FIG. 5. Another cam 35 then actuates a switch 36 to cause the solenoid 33 to open the valve 32 to supply compressed air to the pipe 9 and eject the confectionery 3 from the mould cavities 13 onto the delivery band 21. After demoulding, and as shown in FIG. 6, the cam 35 releases the switch 36 to de-energize the solenoid 33 and close the valve 32 and the cam 34 causes the valve 28 to reverse the air supply to the cylinder 26 and raise the bar 22. When the next mould 1 comes to rest beneath the air pipe 9 the above-described ejection cycle is repeated.

The demoulding unit shown in FIGS. 7 and 8 is generally similar but adapted for use with continuously travelling moulds. In this case the clamp bar 22 and the cylinder 26 are mounted on a carriage 37, mounted to slide on rollers 38 mounted on the machine frame in a direction parallel to the path of movement of the moulds and carrying a follower 39 which is maintained by a spring 40 in engagement with a cam 41. The clamp bar 22 is lowered for demoulding and the valve 32 is opened under control of the cams 34 and 35 are previously described. During demoulding the carriage 37 moves to the right under control of the cam 41 at the same speed as the moulds as shown in FIG. 7. After the clamp bar 22 has been raised following demoulding, as shown in FIG. 8, the cam 41 rapidly returns the carriage 37 to the left to enable the next demoulding cycle to commence.

In FIGS. 5–8 a single hole 15 is, for purposes of clarity, shown in the base of each mould cavity 13. It will be understood, however, that each cavity has in its base a plurality of minute holes 15 as indicated in FIGS. 4 and 4A.

The drilling of minute air holes 15 in the bases of the mould cavities 13 is a time-consuming, complicated and costly operation. For instance, a typical confectionery moulding plant will, in practice, have 1200 moulds, and each mould will have 20 cavities each having say 5 holes of about 0.016" diameter. This means that 120,000 holes have to be drilled. One way of providing satisfactory air passages without the need for multiple drilling operations is illustrated in FIGS. 9 to 11 wherein, as shown in FIG. 6, a single hole 16 of about 8 mm diameter is drilled in the base of the mould cavity 14 and a plug 17, shown in more detail in FIG. 10, having half-round grooves 18 running along its length, is fitted into the hole 16. The plug is shaped with a shoulder 19 so that it seats within the hole 16 when placed therein from the back of the cavity 13 during construction of the mould 7. The grooves 18 provide air passages which replace the drilled holes and have a cross sectional area equal to that of a hole of diameter 0.020". Such an arrangement provides small air passages and is a practical alternative to drilling holes which must be minute to prevent the liquid confectionery material entering them and also small enough to provide a high resistance to keep the pressure drop over a complete mould as even as possible.

The grooved plugs may be manufactured from metal or plastics extruded bar 20 FIG. 11, with the shoulder being machined, or by plastics injection moulding to size.

As an alternative, as shown in FIGS. 12–14, the single hole 16 may be provided with grooves 16A in its rim by a reaming operation and a cylindrical plug 17A may then be fitted into the grooved hole as indicated in FIG. 14. The grooves 16A then constitute the minute demoulding holes.

I claim:

1. Apparatus for moulding confectionery, comprising a conveyor, a train of moulds attached to said conveyor, each of said moulds comprising a body formed with at least one mould cavity having in its base a plurality of minute holes, a backing plate, formed with a hole, being attached to the body and being spaced from the base of each mould cavity to define an air chamber, and a demoulding unit, said conveyor being operative to bring said moulds in succession to a position in which said mould is disposed beneath said demoulding unit in inverted relation and with each mould cavity therein facing downwardly, said demoulding unit including an air pipe, means for moving said air pipe downwardly into sealing engagement with said hole in the backing plate of the mould positioned beneath the demoulding unit and means for discharging compressed air from said pipe into the air chamber of said mould and thence through the minute holes in the base of each mould cavity to effect discharge of the confectionery in each mould cavity in the mould.

2. Apparatus according to claim 1, in which the base of each mould cavity has a single hole containing a grooved plug, the grooves in the plug forming the minute holes for the passage of demoulding compressed air.

3. Apparatus according to claim 1, in which the base of each mould cavity has a single hole having grooves reamed in its rim and a cylindrical plug fitted into the hole, the grooves in the rim of the hole forming the minute holes for the passage of demoulding compressed air.

4. Apparatus according to claim 1, in which the demoulding unit includes a clamp bar carrying the air pipe, an air cylinder operative to move the clamp bar periodically into position to bring the air pipe into sealing engagement with the holes in the base plates of successive moulds, a cam-operated valve for controlling operation of the air cylinder, a solenoid-controlled valve for admitting compressed air to the air pipe, and a cam-controlled switch for periodically opening and closing the solenoid controlled valve.

5. Apparatus according to claim 4, in which the conveyor advances the moulds continuously, in which the clamping bar and the air cylinder are mounted for movement in a direction parallel to the path of movement of the moulds and which includes means for advancing the carriage at the same speed as the moulds when the air pipe is in engagement with a mould and retracting the carriage during intervening periods when the air pipe is disengaged from the moulds.

* * * * *